Figure 1:
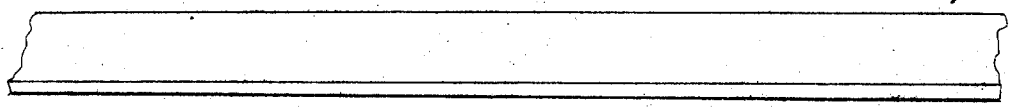

C.HAS ROWLAND

LEATHER PEG

74148

PATENTED FEB 4 1868

Witnesses
P.T. Dodge
W.E. Dodge

Inventor,
Chs Rowland

United States Patent Office.

CHARLES ROWLAND, OF QUINCY, ILLINOIS, ASSIGNOR TO HIMSELF AND JOSEPH G. ROWLAND, OF SAME PLACE.

Letters Patent No. 74,148, dated February 4, 1868.

IMPROVED CONTINUOUS LEATHER-PEG STRIP.

The Schedule referred to in these Letters Patent and making part of the same.

TO ALL WHOM IT MAY CONCERN:

Be it known that I, CHARLES ROWLAND, of Quincy, in the county of Adams, and State of Illinois, have invented certain new and useful Improvements in Leather Strips for Pegs; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in the production of a leather strip, suitably prepared, to be used for pegs in pegging-machines, as a substitute for the wooden strip heretofore used. In the drawings—

Figure 2:

Figure 1 represents a side view of the prepared strip,

Figure 2 a cross-section of the same, and

Figure 3:
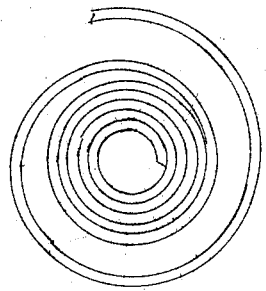

Figure 3 represents the strip coiled ready for use.

In preparing my strip, I first cut the leather into strips of a width equal to the desired length of the pegs, and make it of a uniform thickness, equal to the thickness of the peg when cut, and then bevel the sides along one edge, the same as is done with the wooden strip. When thus prepared, I saturate the strip with a solution of shellac, parchment, glue, or any suitable and similar solution, to render it rigid, so as to impart to the peg, when cut, sufficient rigidity to enable it to be driven into the hole made for it by the awl. The strip thus prepared is to be used in the pegging-machine the same as the wooden peg-strip is now used. It is obvious that pegs may be cut from a strip thus prepared, and used singly, if desired.

The strips may be made of any desired length, by bevelling and lapping the ends and uniting them by cement, the same as is done in forming leather belts.

Having thus described my invention, what I claim, is—

The leather strip for pegs, prepared substantially as described, as a new article of manufacture.

CH'S ROWLAND.

Witnesses:
W. C. DODGE,
H. B. MUNN.